United States Patent
Ni et al.

(10) Patent No.: US 10,808,112 B2
(45) Date of Patent: Oct. 20, 2020

(54) PROPYLENE-BASED POLYMER COMPOSITIONS WITH IMPROVED CRYSTALLIZATION

(71) Applicant: ExxonMobil Chemical Patents Inc., Baytown, TX (US)

(72) Inventors: Yi Ping Ni, Shanghai (CN); Thomas Cugnon, Perwez (BE); Xin Chen, Humble, TX (US); Yinjie Zhang, Shanghai (CN); Saifudin M. Abubakar, Shanghai (CN); Willy J. J. Leysen, Sao Paulo (BR); Tie Y. Ye, Shanghai (CN); Yijin Zhang, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 57 days.

(21) Appl. No.: 16/179,042

(22) Filed: Nov. 2, 2018

(65) Prior Publication Data
US 2019/0185649 A1     Jun. 20, 2019

Related U.S. Application Data

(60) Provisional application No. 62/599,106, filed on Dec. 15, 2017.

(51) Int. Cl.
*C08L 23/14* (2006.01)
*C08J 5/18* (2006.01)

(52) U.S. Cl.
CPC ............... *C08L 23/142* (2013.01); *C08J 5/18* (2013.01); *C08J 2323/14* (2013.01);
(Continued)

(58) Field of Classification Search
CPC ............. C08L 23/142; C08L 2205/025; C08L 2205/03; C08J 2423/04; C08J 2423/06
See application file for complete search history.

(56) References Cited

U.S. PATENT DOCUMENTS

| 4,713,419 A | * | 12/1987 | Takimoto | C08L 23/142 |
| | | | | 428/31 |
| 4,946,896 A | * | 8/1990 | Mitsuno | C08L 23/10 |
| | | | | 525/194 |

(Continued)

FOREIGN PATENT DOCUMENTS

WO     2016/154769     10/2016

OTHER PUBLICATIONS

Wang et al. Dynamic mechanical properties, crystallization behaviors, and lowtemperature performance of polypropylene random copolymer composites. J. Appl. Polym. Sci. 2016, DOI: 10.1002/APP.42960. (Year: 2016).*

*Primary Examiner* — Michael M Dollinger

(57) ABSTRACT

The present invention is related to a composition with about 80 wt % to about 95 wt % of a polymer blend, wherein the polymer blend comprises (a) about 3 wt % to about 25 wt % of a first propylene-based elastomer based on the polymer blend, and (b) about 75 wt % to about 97 wt % of a second propylene-based elastomer based on the polymer blend; and about 5 wt % to about 20 wt % of an ethylene-based polymer; wherein the first propylene-based elastomer and the second propylene-based elastomer each comprise the following: propylene and from about 2 to about 25 wt % units derived from one or more $C_2$ or $C_4$-$C_{12}$ alpha-olefins; triad tacticity greater than about 90% and a heat of fusion less than about 75 J; and wherein the first propylene-based elastomer is different from the second propylene-based elastomer.

10 Claims, 9 Drawing Sheets

(52) U.S. Cl.
CPC ........ *C08J 2423/06* (2013.01); *C08J 2423/14* (2013.01); *C08L 2203/16* (2013.01); *C08L 2205/025* (2013.01); *C08L 2205/03* (2013.01); *C08L 2205/24* (2013.01); *C08L 2207/066* (2013.01)

(56) References Cited

U.S. PATENT DOCUMENTS

| | | | |
|---|---|---|---|
| 5,620,760 A * | 4/1997 | Galimberti | A61L 27/16 428/35.5 |
| 9,738,778 B2 * | 8/2017 | Fantinel | C08F 4/61916 |
| 10,344,151 B2 * | 7/2019 | Xu | C08L 23/10 |
| 2015/0099840 A1 * | 4/2015 | Glogovsky | C08L 23/12 524/400 |
| 2017/0355841 A1 * | 12/2017 | Schauder | C09J 123/14 |
| 2018/0030258 A1 | 2/2018 | Chen et al. | |

* cited by examiner

PROPYLENE-BASED POLYMER COMPOSITIONS WITH IMPROVED CRYSTALLIZATION

CROSS-REFERENCE OF RELATED APPLICATIONS

This application claims the benefit of Provisional Application No. 62/599,106, filed Dec. 15, 2017, the disclosure of which is incorporated herein by reference.

FIELD OF INVENTION

The invention relates to propylene-based compositions with improved crystallization properties.

BACKGROUND

Polyolefin-based polymers, such as propylene-based polymers, are customarily provided in a molten form into a plunger-type apparatus to produce injection molded articles as well as formed into films. These polymers generally have a long crystallization temperature that can cause processing challenges, such as too long of a cooling time for injection molded articles, difficulties cutting polymer strands in compounding and adding embossed patterns on surfaces, and increased tackiness of films when rolled. These challenges limit the use of these polymers in a wider range of applications.

Accordingly, there remains a need for a propylene-based formulation for use in an injection molding applications and film applications with good mechanical, optical, and crystallization characteristics, as compared to formulations that are currently available. The foregoing and/or other challenges are addressed by the methods and products disclosed herein.

SUMMARY

Figure 1:
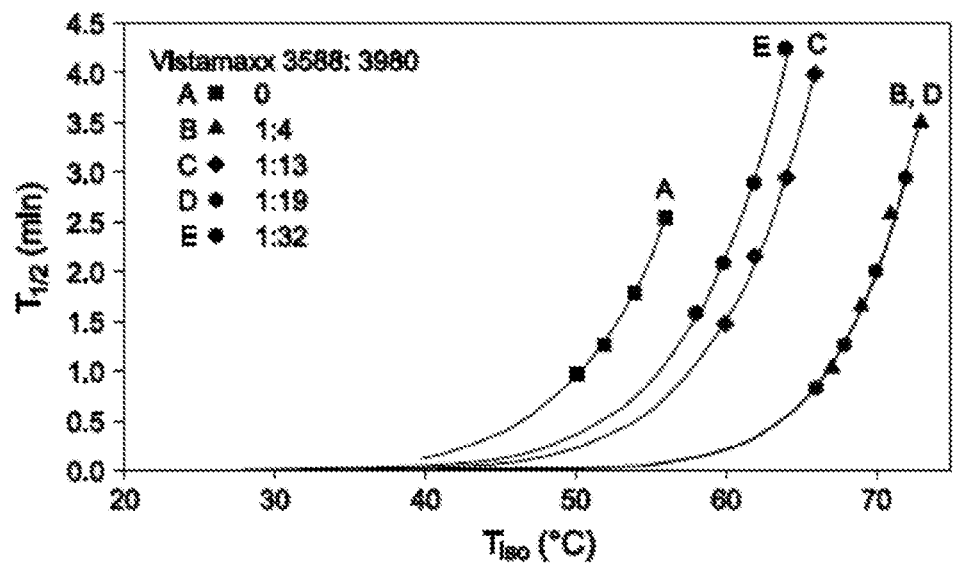
FIG. 1 shows the crystallization half time of five polymer blends.

In one aspect, disclosed herein is a composition having (a) about 80 wt % to about 95 wt % of a polymer blend, wherein the polymer blend comprises about 3 wt % to about 25 wt % of a first propylene-based elastomer based on the polymer blend, and about 75 wt % to about 97 wt % of a second propylene-based elastomer based on the polymer blend; and (b) about 5 wt % to about 20 wt % of an ethylene-based polymer; wherein the first propylene-based elastomer and the second propylene-based elastomer each comprise the following: (i) propylene and from about 2 to about 25 wt % units derived from one or more $C_2$ or $C_4$-$C_{12}$ alpha-olefins; (ii) triad tacticity greater than about 90%; and (iii) a heat of fusion less than about 75 J; and wherein the first propylene-based elastomer is different from the second propylene-based elastomer.

In another aspect, disclosed herein is a method to increase the crystallinity of a propylene-based elastomer, comprising the steps of (a) blending a propylene-based elastomer and a polymer blend modifier, wherein the propylene-based elastomer comprises propylene and from about 2 to about 25 wt % units derived from one or more $C_2$ or $C_4$-$C_{12}$ alpha-olefins, a triad tacticity greater than about 90%; and a heat of fusion less than about 75 J to form a polymer blend; (b) crystallizing the polymer blend wherein the temperature rate to quench the polymer blend is the range of about 10° C./min to about 700° C./min.

DETAILED DESCRIPTION

Various specific embodiments of the invention will now be described, including preferred embodiments and definitions that are adopted herein for purposes of understanding the claimed invention. While the illustrative embodiments have been described with particularity, it will be understood that various other modifications will be apparent to and can be readily made by those skilled in the art without departing from the spirit and scope of the invention. For determining infringement, the scope of the "invention" will refer to any one or more of the appended claims, including their equivalents and elements or limitations that are equivalent to those that are recited.

Novel propylene-based polymer grades with lower copolymer content, such as Vistamaxx™ 3588 propylene-based elastomer commercially available from ExxonMobil Chemical Company are known to increase crystallinity and hence improve processability of propylene-based polymer blends to which it has been added to. The inventors have unexpectedly discovered a non-linear improvement in the crystallinity of Vistamaxx 3588 when blended with low crystallinity polymers. Further, when compounded into film applications, blends containing Vistamaxx 3588 surprisingly showed improved mechanical and optical properties compared to films without this propylene-based elastomer.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" shall mean any polymer exhibiting some degree of elasticity, where elasticity is the ability of a material that has been deformed by a force (such as by stretching) to return at least partially to its original dimensions once the force has been removed.

"Propylene-based" as used herein, is meant to include any polymer comprising propylene, either alone or in combination with one or more comonomers, in which propylene is the major component (i.e., greater than 50 mol % propylene).

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Reactor blend," as used herein, means a highly dispersed and mechanically inseparable blend of two or more polymers produced in situ as the result of sequential or parallel polymerization of one or more monomers with the formation of one polymer in the presence of another, or by solution blending polymers made separately in parallel reactors. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

The polymers described herein, including the polymer blend modifier and the propylene-based elastomer, may be prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the process described above yields the catalytically active component (catalyst) of the catalyst system. Any given transition metal compound or catalyst precursor can yield a catalytically active component (catalyst) with various activators, affording a wide array of catalysts deployable in the processes described herein. Catalyst systems useful in the processes described herein comprise at least one transition metal compound and at least one activator. However, catalyst systems of the current disclosure may also comprise more than one transition metal compound in combination with one or more activators. Such catalyst systems may optionally include impurity scavengers. The triad tacticity and tacticity index of the polymer may be controlled by the catalyst, which influences the stereoregularity of propylene placement, the polymerization temperature, according to which stereoregularity can be reduced by increasing the temperature, and by the type and amount of a comonomer, which tends to reduce the length of crystalline propylene derived sequences.

Polymer Blend Modifiers

In an embodiment, the Polymer Blend Modifiers ("PBMs") useful for making the polymer blend of the invention comprise a first propylene-based polymer, wherein the first propylene-based polymer is a homopolymer of propylene or a copolymer of propylene and ethylene or a $C_4$ to $C_{10}$ alpha-olefin; and a second propylene-based polymer, wherein the second propylene-based polymer is a homopolymer of propylene or comprises a comonomer of ethylene or a $C_4$ to $C_{10}$ alpha-olefin; wherein the second propylene-based polymer is compositionally different than the first propylene-based polymer. In an embodiment, the PBM has a melt viscosity, measured at 190° C. within the range of from about 800 or 1,000 or 5,000 cP to about 10,000 or 15,000 cP. In an embodiment, the PBM has a Melt Flow Rate ("MFR", 230° C./2.16 kg) within the range of from about 1,000 or 2,000 g/10 min to about 5,000 or 20,000 g/10 min. The polymer blend modifier has a weight average molecular weight of 10,000 or 25,000 or 50,000 to 75,000 or 100,000 g/mole. A suitable PBM for use in the present invention include some Vistamaxx™ grades available from ExxonMobil Chemical, including Vistamaxx™ 8880.

In another embodiment, the PBM useful for making the polymer blend of the invention is a propylene-based polymer, preferably a propylene-based copolymer or terpolymer where the copolymer/terpolymer comprises $C_2$-$C_4$ units, in the range from about 2 to about 15 wt % based on the polymer and have a MFR within the range from about 4 g/10 min to about 20 g/10 min. A suitable PBM for use in the present invention includes some Adsyln grades available from Lyondell Basell, such as Adsyl 5C30F and 3C30F.

Propylene-Based Elastomers

The polymer blends used to form the injection molding compositions described herein comprise one or more propylene-based elastomers ("PBEs"). The PBE comprises propylene and from about 5 to about 25 wt % of one or more comonomers selected from ethylene and/or $C_4$-$C_{12}$ α-olefins. The α-olefin comonomer units may be derived from ethylene, butene, pentene, hexene, 4-methyl-1-pentene, octene, or decene. In preferred embodiments the α-olefin is ethylene. In some embodiments, the propylene-based polymer composition consists essentially of propylene and ethylene, or consists only of propylene and ethylene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

The PBE may include at least about 5 wt %, at least about 6 wt %, at least about 7 wt %, or at least about 8 wt %, or at least about 9 wt %, or at least about 10 wt %, or at least about 12 wt % ethylene-derived units, where the percentage by weight is based upon the total weight of the propylene-derived and ethylene-derived units. The PBE may include up to about 30 wt %, or up to about 25 wt %, or up to about 22 wt %, or up to about 20 wt %, or up to about 19 wt %, or up to about 18 wt %, or up to about 17 wt % ethylene-derived units, where the percentage by weight is based upon the total weight of the propylene-derived and ethylene-derived units. In some embodiments, the PBE may comprise from about 5 to about 25 wt % ethylene-derived units, or from about 7 wt % to about 20 wt % ethylene, or from about 9 to about 18 wt % ethylene-derived units, where the percentage by weight is based upon the total weight of the propylene-derived and ethylene-derived units.

The PBE may include at least about 70 wt %, or at least about 75 wt %, or at least about 80 wt %, or at least about 81 wt % propylene-derived units, or at least about 82 wt %, or at least about 83 wt % propylene-derived units, where the percentage by weight is based upon the total weight of the propylene-derived and α-olefin derived units. The PBE may include up to about 95 wt %, or up to about 94 wt %, or up to about 93 wt %, or up to about 92 wt %, or up to about 90 wt %, or up to about 88 wt % propylene-derived units, where the percentage by weight is based upon the total weight of the propylene-derived and α-olefin derived units.

The PBE can be characterized by a melting point (Tm), which can be determined by differential scanning calorimetry (DSC). Using the DSC test method described herein, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. A "peak" in this context is thus defined as a change in the general slope of the DSC curve (heat flow versus temperature) from positive to negative, forming a maximum without a shift in the baseline where the DSC curve is plotted so that an endothermic reaction would be shown with a positive peak.

The Tm of the PBE (as determined by DSC) may be less than about 115° C., or less than about 110° C., or less than about 100° C., or less than about 95° C., or less than about 90° C. In some embodiments, the PBE may have two melting peaks as determined by DSC. In other embodiments, the PBE may have a single melting peak as determined by DSC.

The PBE may be characterized by its heat of fusion (Hf), as determined by DSC. The PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. The PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g, or less than 25 J/g.

The DSC procedures for determining Tm and Hf of the PBE include the following. The polymer is pressed at a temperature of from about 200° C. to about 230° C. in a heated press, and the resulting polymer sheet is hung, under ambient conditions (23° C.), in the air to cool. About 6 to 10 mg of the polymer sheet is removed with a punch die. This 6 to 10 mg sample is annealed at room temperature (23° C.) for about 80 to 100 hours. At the end of this period, the sample is placed in a DSC (Perkin Elmer Pyris One Thermal Analysis System) and cooled to about −30° C. to about −50° C. at a rate of 10° C./min and held for 10 minutes at that temperature. The sample is heated at 10° C./min to attain a final temperature of about 200° C. The sample is kept at 200° C. for 5 minutes. Then a second cool-heat cycle is performed using the same conditions as the first cool-heat cycle. Events from both cycles are recorded. The thermal output is recorded as the area under the melting peak of the sample, which typically occurs between about 0° C. and about 200° C. It is measured in Joules and is a measure of the Hf of the polymer.

Preferably, the PBE has crystalline regions interrupted by non-crystalline regions. The non-crystalline regions can result from regions of non-crystallizable propylene segments, the inclusion of comonomer units, or both. In one or more embodiments, the PBE has a propylene-derived crystallinity that is isotactic, syndiotactic, or a combination thereof. In a preferred embodiment, the PBE has isotactic sequences. The presence of isotactic sequences can be determined by NMR measurements showing two or more propylene derived units arranged isotactically. Such isotactic sequences can, in some cases be interrupted by propylene units that are not isotactically arranged or by other monomers that otherwise disturb the crystallinity derived from the isotactic sequences.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%. Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, may be calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE may have a % crystallinity of from about 0.5% to about 40%, or from about 1% to about 30%, or from about 5% to about 25%, determined according to DSC procedures.

The comonomer content and sequence distribution of the polymers can be measured using $^{13}$C nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm-1 to 4000 cm-1 is recorded and the monomer weight percent of ethylene can be calculated according to the following equation: Ethylene wt %=82.585−111.987X+30.045X2, where X is the ratio of the peak height at 1155 cm-1 and peak height at either 722 cm-1 or 732 cm-1, whichever is higher. For propylene ethylene copolymers having 75 wt % or less propylene content, the comonomer (ethylene) content can be measured using the procedure described in Wheeler and Willis. Reference is made to U.S. Pat. No. 6,525,157 which contains more details on GPC measurements, the determination of ethylene content by NMR and the DSC measurements.

Molecular Weight Characteristics, including Mw (weight average molecular weight), Mn (number average molecular weight) and Mw/Mn (polydispersity index) are determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 µm Mixed-B LS columns are used. The nominal flow rate is 0.5 mL/min, and the nominal injection volume is 300 µL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 µm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. Polystyrene calibration standard is used. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and l=690 nm. Units on parameters throughout this description of the GPC-3D method are such that concentration is expressed in g/cm$^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, DR(q) is the measured excess Rayleigh scattering intensity at scattering angle θ, c is the polymer concentration determined from the DRI analysis, $A_2$ is the second virial coefficient. P(q) is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system, which take the same value as the one obtained from DRI method. The refractive index, v=1.500 for TCB at 145° C. and X=657 nm.

The PBE may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature, as measured per the ASTM D-792 test method.

The PBE can have a melt index (MI) (ASTM D-1238, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

The PBE may have a melt flow rate (MFR), as measured according to ASTM D-1238 (2.16 kg weight @ 230° C.), greater than about 1 g/10 min, or greater than about 2 g/10 min, or greater than about 5 g/10 min, or greater than about 8 g/10 min, or greater than about 10 g/10 min. The PBE may have an MFR less than about 1,000 g/10 min, or less than about 750 g/10 min, or less than about 500 g/10 min, or less than about 400 g/10 min, or less than about 300 g/10 min, or less than about 200 g/10 min, or less than about 100 g/10 min, or less than about 75 g/10 min, or less than about 50 g/10 min. In some embodiments, the PBE may have an MFR from about 1 to about 100 g/10 min, or from about 2 to about 75 g/10 min, or from about 5 to about 50 g/10 min.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l},$$

where ηb is the intrinsic viscosity of the polymer and ηl is the intrinsic viscosity of a linear polymer of the same viscosity-averaged molecular weight (Mv) as the polymer. ηl=KMvα, K and α are measured values for linear polymers and should be obtained on the same instrument as the one used for the g' index measurement.

The PBE may have a weight average molecular weight (Mw) of from about 100,000 to about 300,000 g/mol, or from about 150,000 to about 250,000 g/mol, or from about 150,000 to about 200,000 g/mol.

The PBE may have a number average molecular weight (Mn) of from about 2,500 to about 2,500,000 g/mol, or from about 5,000 to about 500,000 g/mol, or from about 10,000 to about 250,000 g/mol, or from about 25,000 to about 200,000 g/mol.

The PBE may have a Z-average molecular weight (Mz) of from about 10,000 to about 7,000,000 g/mol, or from about 50,000 to about 1,000,000 g/mol, or from about 80,000 to about 700,000 g/mol, or from about 100,000 to about 500,000 g/mol.

The molecular weight distribution (MWD, equal to Mw/Mn) of the PBE may be from about 1 to about 40, or from about 1 to about 15, or from about 1.8 to about 5, or from about 1.8 to about 3.

Optionally, the propylene-based polymer compositions may also include one or more dienes. In embodiments where the propylene-based polymer compositions comprises a diene, the diene may be present at from 0.05 wt % to about 6 wt % diene-derived units, or from about 0.1 wt % to about 5.0 wt % diene-derived units, or from about 0.25 wt % to about 3.0 wt % diene-derived units, or from about 0.5 wt % to about 1.5 wt % diene-derived units, where the percentage by weight is based upon the total weight of the propylene-derived, alpha-olefin derived, and diene-derived units.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates or the like. Illustrative monomers include but are not limited to acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxyl-ethyl methacrylate and higher hydroxy-alkyl methacrylates and glycidyl methacrylate. Maleic anhydride is a preferred grafting monomer. In one or more embodiments, the grafted PBE comprises from about 0.5 to about 10 wt % ethylenically unsaturated carboxylic acid or acid derivative, more preferably from about 0.5 to about 6 wt %, more preferably from about 0.5 to about 3 wt %; in other embodiments from about 1 to about 6 wt %, more preferably from about 1 to about 3 wt %. In a preferred embodiment, wherein the graft monomer is maleic anhydride, the maleic anhydride concentration in the grafted polymer is preferably in the range of about 1 to about 6 wt %, preferably at least about 0.5 wt %, and highly preferably about 1.5 wt %.

In an embodiment, the PBE is a dual-reactor blend of a first polymer component and a second polymer component. In some embodiments, the comonomer content of the PBE can be adjusted by adjusting the comonomer content of the first polymer component, adjusting the comonomer content of second polymer component, and/or adjusting the ratio of the first polymer component to the second polymer component present in the propylene-based polymer composition. In such embodiments, the first polymer component may comprise propylene and ethylene and have an ethylene content of greater than 10 wt % ethylene, or greater than 12 wt % ethylene, or greater than 13 wt % ethylene, or greater than 14 wt % ethylene, or greater than 15 wt % ethylene, and an ethylene content that is less than 20 wt % ethylene, or less than 19 wt % ethylene, or less than 18 wt % ethylene, or less than 17 wt % ethylene, or less than 16 wt % ethylene, where the percentage by weight is based upon the total weight of the propylene-derived and ethylene derived units of the first polymer component. In such embodiments, the second polymer component may comprise propylene and ethylene and have an ethylene content of greater than 2 wt % ethylene, or greater than 3 wt % ethylene, or greater than 4 wt % ethylene, or greater than 5 wt % ethylene, or greater than 6 wt % ethylene, and an ethylene content that is less than 10 wt % ethylene, or less than 9.0 wt % ethylene, or less than 8 wt % ethylene, or less than 7 wt % ethylene, or less than 6 wt % ethylene, or less than 5 wt % ethylene, where the percentage by weight is based upon the total weight of the propylene-derived and ethylene derived units of the second polymer component. In such embodiments, the PBE may comprise from 3 to 25 wt % of the second polymer component, or from 5 to 20 wt % of the second polymer component, or from 7 to 18 wt % of the second polymer component, or from 10 to 15 wt % of the second polymer component, and from 75 to 97 wt % of the first polymer component, or from 80 to 95 wt % of the first polymer component, or from 82 to 93 wt % of the first polymer component, or from 85 to 90 wt % of the first polymer component, based on the weight of the PBE.

The PBE are preferably prepared using homogeneous conditions, such as a continuous solution polymerization process in parallel reactors. Exemplary methods for the preparation of propylene-based polymer may be found in U.S. Pat. Nos. 6,881,800; 7,803,876; 8,013,069; and 8,026,323 and PCT Publications WO 2011/087729; WO 2011/087730; and WO 2011/087731. The catalyst systems used for producing the PBE may comprise a metallocene compound, such as the catalyst used to prepare a PBM described above.

Suitable PBEs for use in the present invention include some Vistamaxx™ grades available from ExxonMobil Chemical, including Vistamaxx™ 3588, 3980 and 6102.

Polymer Blends

In an embodiment, polymer blends according to the present invention comprise at least a first PBE a second PBE. The blend may comprise from about 3 wt % to about 25 wt % of the first PBE, based on the blend, and from about 75 wt % to about 97 wt % of the second PBE, based on the blend. In a preferred embodiment, the first PBE is present in the amount of about 5 wt %, based on the polymer blend, and the second PBE is present in the amount of about 95 wt %, based on the polymer blend.

The polymer blends can be made by dry-blending the first and second PBE or by metering the components directly into an extruder at the desired ratio. The inventors have discovered that the polymer blends comprising at a first and second PBE in the above-mentioned ratios can advantageously exhibit superior crystallization characteristics.

Ethylene-Based Polymers

In one aspect of the invention, the ethylene polymers are selected from ethylene homopolymers, ethylene copolymers, and compositions thereof. Useful copolymers comprise one or more comonomers in addition to ethylene and can be a random copolymer, a statistical copolymer, a block copolymer, and/or compositions thereof. The method of making the polyethylene is not critical, as it can be made by slurry, solution, gas phase, high pressure or other suitable processes, and by using catalyst systems appropriate for the polymerization of polyethylenes, such as Ziegler-Natta-type catalysts, chromium catalysts, metallocene-type catalysts, other appropriate catalyst systems or combinations thereof, or by free-radical polymerization. In a preferred embodiment, the ethylene polymers are made by the catalysts, activators and processes described in U.S. Pat. Nos. 6,342,566; 6,384,142; 5,741,563; and PCT Publication Nos. WO 03/040201; and WO 97/19991. Such catalysts are well known in the art, and are described in, for example, ZIEGLER CATALYSTS (Gerhard Fink, Rolf Milhaupt and Hans H. Brintzinger, eds., Springer-Verlag 1995); Resconi et al.; and I, II METALLOCENE-BASED POLYOLEFINS (Wiley & Sons 2000). In one aspect of the invention, ethylene polymers may be selected from those that are not prepared using catalyst systems, for example low density polyethylene that is prepared using a peroxide initiator mechanism.

Ethylene polymers and copolymers that are useful in this invention include those sold by ExxonMobil Chemical Company in Houston Tex., including HDPE, LLDPE, and LDPE; and those sold under the ENABLE™, EXACT™, EXCEED™, EXCEED™XP, ESCORENE™, EXXCO™, ESCOR™, PAXON™, LD, and OPTEMA™ tradenames.

Preferred ethylene homopolymers and copolymers useful in this invention typically have:

1. an $M_w$ of 20,000 g/mol or more, 20,000 to 2,000,000 g/mol, preferably 30,000 to 1,000,000, preferably 40,000 to 200,000, preferably 50,000 to 750,000, as measured by size exclusion chromatography; and/or 2. an $M_w/M_n$ of 1 to 40, preferably 1.6 to 20, or 8 to 25, more preferably 1.8 to 10, more preferably 1.8 to 4, as measured by size exclusion chromatography; and/or 3. a $T_m$ of 30° C. to 150° C., preferably 30° C. to 140° C., preferably 50° C. to 140° C., more preferably 60° C. to 135° C., as determined based on ASTM D3418-03; and/or
4. a crystallinity of 5% to 80%, preferably 10% to 70%, more preferably 20% to 60%, preferably at least 30%, or at least 40%, or at least 50%, as determined based on ASTM D3418-03; and/or
5. a heat of fusion of 300 J/g or less, preferably 1 to 260 J/g, preferably 5 to 240 J/g, preferably 10 to 200 J/g, as determined based on ASTM D3418-03; and/or
6. a crystallization temperature ($T_c$) of 15° C. to 130° C., preferably 20° C. to 120° C., more preferably 25° C. to 110° C., preferably 60° C. to 125° C., as determined based on ASTM D3418-03; and/or
7. a heat deflection temperature of 30° C. to 120° C., preferably 40° C. to 100° C., more preferably 50° C. to 80° C. as measured based on ASTM D648 on injection molded flexure bars, at 66 psi load (455 kPa); and/or
8. a Shore hardness (D scale) of 10 or more, preferably 20 or more, preferably 30 or more, preferably 40 or more, preferably 100 or less, preferably from 25 to 75 (as measured based on ASTM D 2240); and/or
9. a percent amorphous content of at least 20%, preferably at least 50%, preferably at least 60%, more preferably between 50% and 95%, or 70% or less, preferably 60% or less, preferably 50% or less as determined by subtracting the percent crystallinity from 100; and/or
10. a branching index (g'vis) of 0.97 or more, preferably 0.98 or more, preferably 0.99 or more, preferably 1; and/or
11. a density of about 0.860 to about 0.980 g/cm³ (preferably from 0.880 to 0.965 g/cm³, preferably from 0.910 to 0.962 g/cm³, preferably from 0.915 to 0.961 g/cm³) determined based on ASTM D 1505 using a density-gradient column on a compression-molded specimen that has been slowly cooled to room temperature (i.e. over a period of 10 minutes or more) and allowed to age for a sufficient time that the density is constant within +/−0.001 g/cm³.

The polyethylene may be an ethylene homopolymer, such as HDPE. In one embodiment, the ethylene homopolymer has a molecular weight distribution ($M_w/M_n$) of up to 40, preferably ranging from 1.5 to 20, or from 1.8 to 10, or from 1.9 to 5, or from 2.0 to 4. In another embodiment, the 1% secant flexural modulus (determined based on ASTM D790A, where test specimen geometry is as specified under the ASTM D790 section "Molding Materials (Thermoplastics and Thermosets)," and the support span is 2 inches (5.08 cm)) of the ethylene polymer falls in a range of 200 to 1000 MPa, and from 300 to 800 MPa in another embodiment, and from 400 to 750 MPa in yet another embodiment, wherein a desirable polymer may exhibit any combination of any upper flexural modulus limit with any lower flexural modulus limit. The melt index (MI) of preferred ethylene homopolymers range from 0.05 to 800 dg/min in one embodiment, and from 0.1 to 100 dg/min in another embodiment, as measured based on ASTM D1238 (190° C., 2.16 kg).

In a preferred embodiment, the polyethylene comprises less than 20 mol % propylene units (preferably less than 15 mol %, preferably less than 10 mol %, preferably less than 5 mol %, and preferably 0 mol % propylene units).

In another embodiment of the invention, the ethylene polymer useful herein is produced by polymerization of ethylene and, optionally, an alpha-olefin with a catalyst having, as a transition metal component, a bis(n-$C_3$-4 alkyl cyclopentadienyl) hafnium compound, wherein the transition metal component preferably comprises from about 95 mol % to about 99 mol % of the hafnium compound as further described in U.S. Pat. No. 9,956,088.

In another embodiment of the invention, the ethylene polymer is an ethylene copolymer, either random or block, of ethylene and one or more comonomers selected from $C_3$ to $C_{20}$ α-olefins, typically from $C_3$ to $C_{10}$ α-olefins. Preferably, the comonomers are present from 0.1 wt % to 50 wt % of the copolymer in one embodiment, and from 0.5 wt % to 30 wt % in another embodiment, and from 1 wt % to 15 wt % in yet another embodiment, and from 0.1 wt % to 5 wt % in yet another embodiment, wherein a desirable copolymer comprises ethylene and $C_3$ to $C_{20}$ α-olefin derived units in any combination of any upper wt % limit with any lower wt % limit described herein. Preferably, the ethylene copolymer will have a weight average molecular weight of from greater than 8,000 g/mol in one embodiment, and greater than 10,000 g/mol in another embodiment, and greater than 12,000 g/mol in yet another embodiment, and greater than 20,000 g/mol in yet another embodiment, and less than 1,000,000 g/mol in yet another embodiment, and less than 800,000 g/mol in yet another embodiment, wherein a desirable copolymer may comprise any upper molecular weight limit with any lower molecular weight limit described herein.

In another embodiment, the ethylene copolymer comprises ethylene and one or more other monomers selected from the group consisting of $C_3$ to $C_{20}$ linear, branched or cyclic monomers, and in some embodiments is a $C_3$ to $C_{12}$ linear or branched alpha-olefin, preferably butene, pentene, hexene, heptene, octene, nonene, decene, dodecene, 4-methyl-pentene-1,3-methyl pentene-1,3,5,5-trimethyl-hexene-1, and the like. The monomers may be present at up to 50 wt %, preferably from 0 wt % to 40 wt %, more preferably from 0.5 wt % to 30 wt %, more preferably from 2 wt % to 30 wt %, more preferably from 5 wt % to 20 wt %, based on the total weight of the ethylene copolymer.

Preferred linear alpha-olefins useful as comonomers for the ethylene copolymers useful in this invention include $C_3$ to $C_8$ alpha-olefins, more preferably 1-butene, 1-hexene, and 1-octene, even more preferably 1-hexene. Preferred branched alpha-olefins include 4-methyl-1-pentene, 3-methyl-1-pentene, 3,5,5-trimethyl-1-hexene, and 5-ethyl-1-nonene. Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally, two adjacent substitutions may be joined to form a ring structure. Preferred aromatic-group-containing monomers contain at least one aromatic structure appended to a polymerizable olefinic moiety. Particularly, preferred aromatic monomers include styrene, alpha-methylstyrene, para-alkyl-styrenes, vinyltoluenes, vinylnaphthalene, allyl benzene, and indene, especially styrene, paramethyl styrene, 4-phenyl-1-butene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., divinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

In a preferred embodiment, one or more dienes are present in the ethylene polymer at up to 10 wt %, preferably at 0.00001 wt % to 2 wt %, preferably 0.002 wt % to 1 wt %, even more preferably 0.003 wt % to 0.5 wt %, based upon the total weight of the ethylene polymer. In some embodiments diene is added to the polymerization in an amount of from an upper limit of 500 ppm, 400 ppm, or 300 ppm to a lower limit of 50 ppm, 100 ppm, or 150 ppm.

In a preferred embodiment, ethylene copolymers useful herein are preferably a copolymer comprising at least 50 wt % ethylene and having up to 50 wt %, preferably 1 wt % to 35 wt %, even more preferably 1 wt % to 6 wt % of a $C_3$ to $C_{20}$ comonomer, preferably a $C_4$ to $C_8$ comonomer, preferably hexene or octene, based upon the weight of the copolymer. The polyethylene copolymers preferably have a composition distribution breadth index (CDBI) of 60% or more, preferably 60% to 80%, preferably 65% to 80%. In another preferred embodiment, the ethylene copolymers have a CDBI of 60% to 80%, preferably between 65% and 80%. Preferably these polymers are metallocene polyethylenes (mPEs).

In another embodiment, ethylene homopolymers may be suitable for the invention.

Useful mPE homopolymers or copolymers may be produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Baytown, Tex. under the tradenames EXCEED™ Polyethylene, EXCEED™XP, or ENABLE™ Polyethylene.

Film Compositions

In an embodiment, the polymer blends may be present in the film composition in the amount of about 80 wt % to about 95 wt %, based on the composition, and the ethylene-based polymer may be present in the film composition in the amount of about 5 wt % to about 20 wt %. The inventive film may be prepared by cast or blown film extrusion methods known in the art.

EXAMPLES

Example 1

In Example 1, the crystallinity improvement of propylene-based elastomers, e.g., Vistamaxx 6102 and 3980, was examined by incorporating a high crystalline elastomer Vistamaxx 3588. Table 1 shows the non-isothermal DSC values of Polymer Blends (A to G) prepared by blending Vistamaxx 3588 with Vistamaxx 6102 or Vistamaxx 3980.

Vistamaxx 3588 is a propylene-based elastomer, commercially available from ExxonMobil Chemical Company having an ethylene content of 4 wt %, a melt flow rate of 8 g/10 min at 230° C. and 2.16 kg, a density of 0.889 g/cm$^3$, a vicat softening temperature of 103° C., and a tensile strength at yield of 16 MPa. Vistamaxx 3980 is a propylene-based elastomer, commercially available from ExxonMobil Chemical Company having an ethylene content of 9 wt %, melt flow rate of 8 g/10 min at 230° C. and 2.16 kg, a melt index of 3.7 g/10 min at 190° C. and 2.16 kg, a density of 0.878 g/cm$^3$, a vicat softening temperature of 77° C., and a tensile strength at yield of 7 MPa. Vistamaxx 6102 is a propylene-based elastomer, commercially available from ExxonMobil Chemical Company having an ethylene content of 16 wt %, melt flow rate of 3 g/10 min at 230° C. and 2.16 kg, a melt index of 1.4 g/10 min at 190° C. and 2.16 kg, a density of 0.862 g/cm$^3$, a vicat softening temperature of 54° C.

TABLE 1

| Polymer Blends | Formulation | Hm (J/g) |
| --- | --- | --- |
| Vistamaxx 3588 | 100 wt % Vistamaxx 3588 | −48 |
| Vistamaxx 3980 | 100 wt % Vistamaxx 3980 | −29 |
| Vistamaxx 6102 | 100 wt % Vistamaxx 6102 | −7 |
| Polymer Blend A | 97 wt % Vistamaxx 3980/ 3 wt % Vistamaxx 3588 | −32 |
| Polymer Blend B | 95 wt % Vistamaxx 3980/ 5 wt % Vistamaxx 3588 | −36 |
| Polymer Blend C | 93 wt % Vistamaxx 3980/ 7 wt % Vistamaxx 3588 | −32 |
| Polymer Blend D | 75 wt % Vistamaxx 3980/ 25 wt % Vistamaxx 3588 | |
| Polymer Blend E | 97 wt % Vistamaxx 6102/ 3 wt % Vistamaxx 3588 | −8 |
| Polymer Blend F | 95 wt % Vistamaxx 6102/ 5 wt % Vistamaxx 3588 | −12 |
| Polymer Blend G | 93 wt % Vistamaxx 6102/ 7 wt % Vistamaxx 3588 | −10 |

Approximately 3.5 g Samples were placed in a Perkin Elmer DSC8500 instrument and held at 200° C. for 2 min, cooled at a rate of 10° C./min from 200° C. to −70° C., held at −70° C. for 2 min, and heated from −70° C. to 200° C. at a rate of 10° C./min. Hm recorded in Table 1 is the area under the Heat Flow versus Temperature plot per gram of sample from the cooling cycle after the 1st heating cycle.

The DSC tests conducted on the Polymer Blends of Table 1 show the amount of Vistamaxx 3588 required to change the crystallization behavior of more amorphous propylene-based elastomers Vistamaxx 3980 and 6102. As shown in Table 1, blending just 5 wt % of Vistamaxx 3588 with Vistamaxx 3980 (Polymer Blend B) resulted in an approximately 24% increase in crystallinity compared to the crystallinity of pure Vistamaxx 3980—corresponding to a comparable crystallinity of blending 40 wt % Vistamaxx 3588 based on linearly plotting the Hm of Vistamaxx 3588 and 3890 as a function of the Hm of 100 wt % Vistamaxx 3588 and 100 wt % Vistamaxx 3980. The inventors discovered that blending 5 wt % Vistamaxx 3588 to Vistamaxx 3980 (Polymer Blend B) unexpectedly outperformed blending 3 wt % (Polymer Blend A) and 7 wt % (Polymer Blend C). As shown in Table 1, blending 5 wt % Vistamaxx 3588 with Vistamaxx 6102 (Polymer Blend F) almost doubled the crystallinity of pure Vistamaxx 6102. Similar with Vistamaxx 3980/3588 blends, the effect to increase the crystallinity of Vistamaxx 6102/3588 blends was superior at 5 wt % Vistamaxx 3588 values (Polymer Blend F) compared to 3 wt % (Polymer Blend E) and 7 wt % (Polymer Blend G).

To evaluate the effect of incorporating Vistamaxx 3588 into 3980, mono-layer cast films having a thickness of 50 μm and 5 wt % low density polyethylene (LDPE 2426) and 95 wt % of a blend of Vistamaxx 3588 and 3980 were prepared, as shown in Table 2. The mono-layer films were prepared with an extruder having 4 heating zones (Zone 1 was at 150° C., Zone 2 was at 175° C., Zone 3 was at 180° C., and Zone 4 was at 180° C.); 3 die zones (Die 1 was at 183° C., Die 2 was at 180° C., and Die 3 was at 183° C.); Chill roll was at 20° C. at a speed of 3.9 m/min; Take off speed was at 3.8 m/min; Winding tension at 0.4 kg; 2 Melt Temperatures (Melt Temperature 1 at 165° C.; Melt Temperature 2 at 147° C.); Two Pressures (Pressure 1 at 54 bar; Pressure 2 at 63 bar). Lupolen LDPE 2426H is a low density polyethylene, commercially available from CNOOC and Shell Petrochemicals Company Ltd. having a melt flow rate of 1.9 g/10 min at 190° C. and 2.16 kg, a density of 0.925 g/cm³, a vicat softening temperature of 94° C., and a tensile strength at yield of 11 MPa. All of the monolayer cast films of Table 2 were run at the same processing conditions.

FIG. 1 shows the isothermal crystallization of films 1-5 of Table 2. Samples of 8 mg were placed in a PerkinElmer DSC8500 instrument and held at 200° C. for 4 min, cooled at a rate of 750° C./min from 200° C. to 64° C., held at 64° C. for 20 min. Halftime values recorded in FIG. 1 were obtained when percentage crystallinity reaches 50% in diagram of time versus percentage crystallinity.

The half time of crystallization was recorded at various half-time intervals. As the amount of the Vistamaxx 3588 in the Polymer Blend increased, halftime was gradually decreased, thereby corresponding to a faster crystallization facilitated by more Vistamaxx 3588. The inventors unexpectedly discovered that the halftime of Film 4 (5 wt % Vistamaxx 3588) overlapped with that of Film 2 (25 wt % Vistamaxx 3588).

The films of Table 2 were tested for internal haze and tensile properties. Internal haze was measured according to ASTM D-1003. Tensile at break, Elongation at Break, Energy to Break, and 1% Secant Modulus were all measured according to ASTM D-882. Internal haze reflects the crystal size in films. Faster crystallization results in smaller crystals and a lower internal haze value. The smallest internal haze was observed with Film 4 (5 wt % Vistamaxx 3588) and therefore Film 4 displayed the most improved optical properties as compared to the other films of Table 2. Tensile properties of Film 4 were likewise improved or comparable to those of comparative Film 1 (0 wt % Vistamaxx 3588). The film properties reported in Table 2 indicate that mechanical properties (toughness and stiffness) of films may be enhanced or maintained by adding Vistamaxx 3588, without compromising processability of the films.

TABLE 2

| Film | Formulation | Ratio Vistamaxx 3588/ Vistamaxx 3980 | Thickness (μm) | Internal Haze (%) | Tensile at Break (MPa) MD | TD | Elongation at Break (%) MD | TD | Energy to Break (mJ/mm³) MD | TD | 1% Secant Modulus (MPa) MD | TD |
|---|---|---|---|---|---|---|---|---|---|---|---|---|
| 1 | 95 wt % Vistamaxx 3980/ 5 wt % LDPE 2426 | 0 | 58 | 3.9 | 32 | 26 | 355 | 758 | 61 | 79 | 132 | 130 |
| 2 | 95 wt % Polymer Blend D/ 5 wt % LDPE 2426 | 1/4 | 58 | 4.0 | 42 | 32 | 431 | 755 | 85 | 97 | 153 | 163 |
| 3 | 95 wt % Polymer Blend C/ 5 wt % LDPE 2426 | 1/13 | 55 | 3.4 | 38 | 28 | 376 | 750 | 71 | 84 | 136 | 147 |
| 4 | 95 wt % Polymer Blend B/ 5 wt % LDPE 2426 | 1/19 | 53 | 3.3 | 39 | 28 | 393 | 744 | 73 | 84 | 133 | 146 |
| 5 | 95 wt % Polymer Blend A/ 5 wt % LDPE 2426 | 1/32 | 58 | 4.7 | 38 | 30 | 396 | 741 | 74 | 88 | 139 | 152 |

Example 2

In Example 2, the crystallization rates of Vistamaxx™ 3588 propylene-based elastomer was evaluated, when modifiers such as Vistamaxx™ 8880 propylene-based elastomer, Adsyl 5C30F, Adsyl 3C30F, and Versify 3000 were added. Vistamaxx 8880 is a C3-C2 polyolefin, commercially available from ExxonMobil Chemical Company having an ethylene content of 6 wt %, a density of 0.879 g/cm³, a viscosity of 1200 cP at 190° C., a melting temperature of 97° C., and a glass transition temperature of −22° C. prepared using metallocene catalyst. Adsyl 5C10F is a polyolefin commercially available from Lyondell Basell having a melt flow rate of 5.5 g/10 min and density of 0.9 g/cm³. Versify 3000 is a C3-C2 plastomer commercially available from Dow Chemical Company having a density of 0.8665 g/cm³, a melt flow rate of 8 g/10 min, a total crystallinity of 17%, a shore A hardness of 83, and a glass transition temperature of −32° C. Adsyl 3C30F is a polyolefin commercially available from Lyondell Basell having a melt flow rate of 5.5 g/10 min and density of 0.9 g/cm³.

The melting peak after crystallization was measured for Vistamaxx 3588, Adsyl 5C30F, Versify 3000, and Adsyl 3C30F at different cooling rates. PerkinElmer DSC8500 with helium purge was used to evaluate each of the polymers. Samples were cut from pellets and sealed in an aluminum pan. The influence of different cooling rates was studied by designing with the following procedure. (1) Samples were held at 4 minute at a temperature of 200° C.; (2) Samples were Ballistically Cooled from 200° C. to 20° C. at a rate of 2100° C./min; (3) Samples were heated from 20° C. to 200° C. at a rate of 10° C./min; (4) Samples were held at 200° C. for 4 minutes; (5) Samples were cooled from 200° C. to 20° C. at a rate of 750° C./min; (6) Samples were heated from 20° C. to 200° C. at a rate of 100° C./min; (7) Samples were held at 200° C. for 4 minutes; (8) Samples were cooled from 200° C. to 20° C. at a rate of 500° C./min; (9) Samples were heated from 20° C. to 200° C. at a rate of 10° C./min; (10) Samples were held at 200° C. for 4 minutes; (11) Samples were cooled from 200° C. to 20° C. at a rate of 300° C./min; (12) Samples were heated from 20° C. to 200° C. at a rate of 10° C./min; (13) Samples were held at 200° C. for 4 minutes; (14) Samples were cooled from 200° C. to 20° C. at 200° C./min; (15) Samples were heated from 20° C. to 200° C. at a rate of 10° C./min; (16) Samples were held at 200° C. for 4 minutes; (17) Samples were cooled from 200° C. to 20° C. at a rate of 100° C./min; (18) Samples were heated from 20° C. to 200° C. at a rate of 10° C./min; (19) Samples were held at 200° C. for 4 minutes; (20) Samples were cooled from 200° C. to 20° C. at a rate of 50° C./min; and (21) Samples were heating from 20° C. to 200° C. at a rate of 10° C. min. The melting curves from Steps 3, 6, 9, 12, 15, 18, and 21 were collected. Melting peaks are shown in FIG. 2 after crystallization at different cooling rates (from top to bottom of each of FIGS. 2a-2d): 10° C./min, 50° C./min, 100° C./min, 200° C./min, 300° C./min, 500° C./min, 750° C./min, 2100° C./min (ballistic cooling).

Figure 2A:
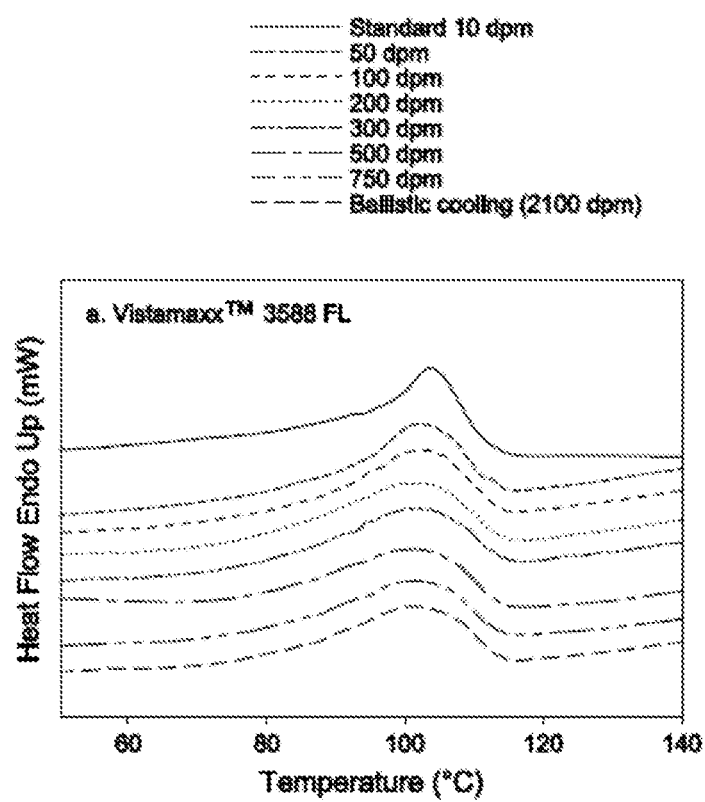
FIGS. 2a-2d shows the melting peak of four polymers.
Figure 2B:
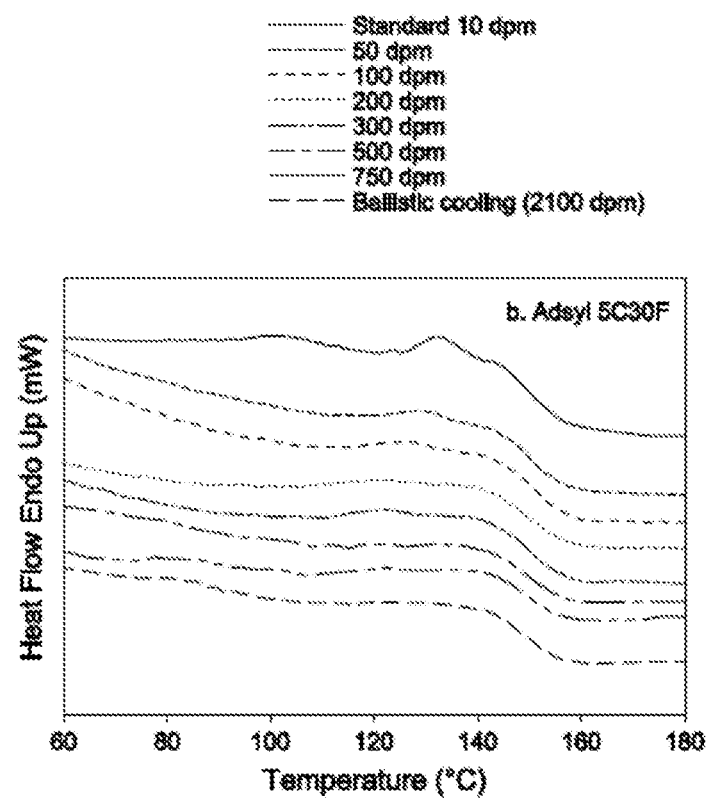
Figure 2C:
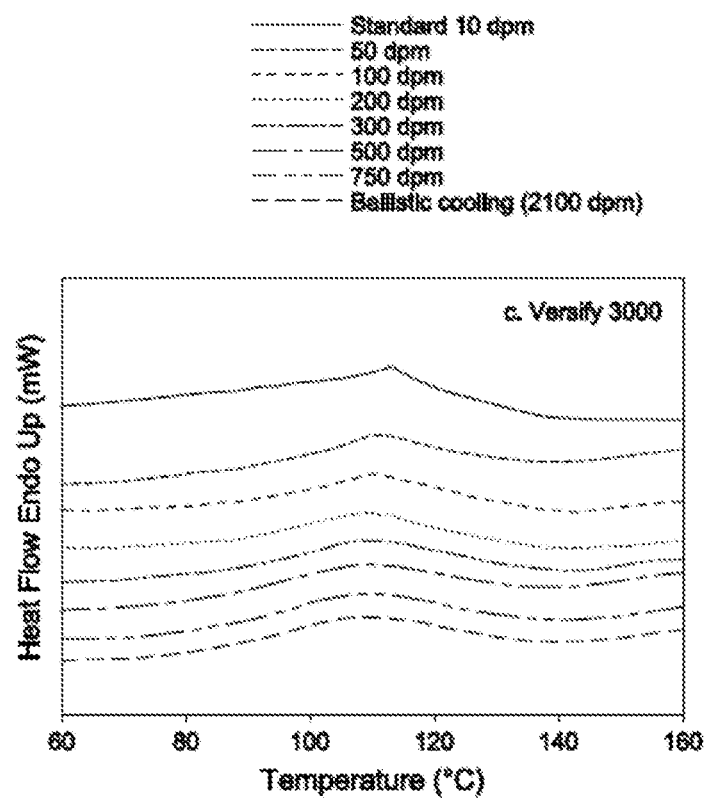
Figure 2D:
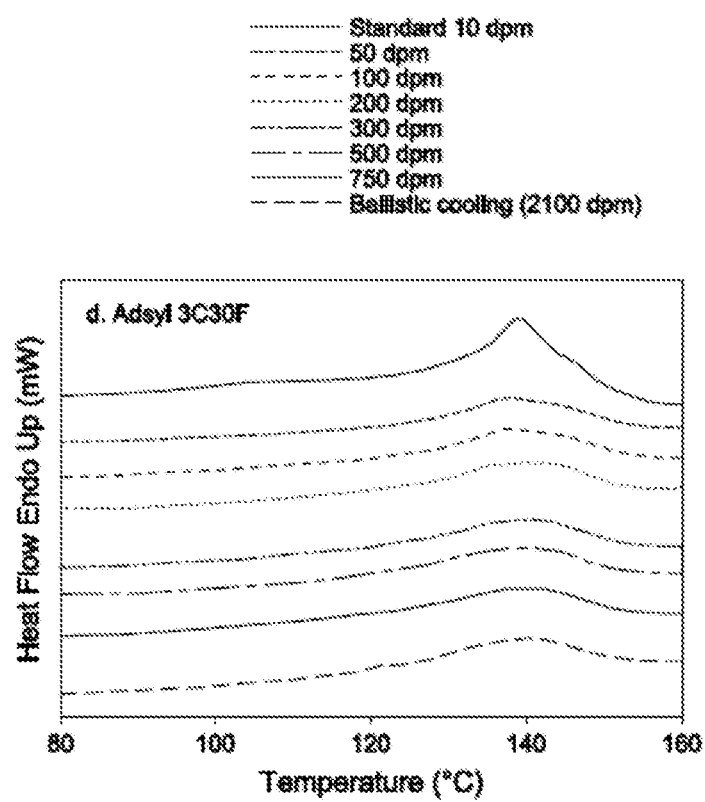

Typically, melting peak will give melting temperature information Tm. The Tm is related to the crystal strength. If the crystals formed are densely packed or have large sizes, they polymer has a higher Tm. As shown in FIGS. 2a-2d, the Tm after quenching with ballistic cooling (2100° C./min) for Versify 3000, Adysl 3C30F, Adysl 5C30F, and Vistamaxx 3588 was 109° C., 139° C., 138° C., and 101° C., respectively. The melting temperature of Vistamaxx 3588 was the lowest of the four polymers evaluated, indicating that its crystals are not as densely packed and/or smaller than that of the other polymers ("low crystal strength"). Such low crystal strength of Vistamaxx 3588 in comparison to Versify 3000, and Adysl 3C30F, Adysl 5C30F results in poor surface strength of articles made using this polymer and resulting pattern effects. Furthermore, quenching with different cooling rates in FIG. 2 caused crystal reinforcement phenomenon as shown in FIGS. 2b and 2d where a side melting peak of about 100° C. was shown if samples were tested with a cooling rate of 10° C./min. The peak areas of the graphs of FIG. 2 indicate that about 30-50% of the total crystallinity was attributed to the low crystal strength. However, the side melting peak was merged with the main melting peak at higher cooling rates, implying that faster/high cooling rates favorably forms stronger crystal strength in Adysl (FIG. 2b) and therefore improves surface strength of articles containing such polymer.

Figure 3:
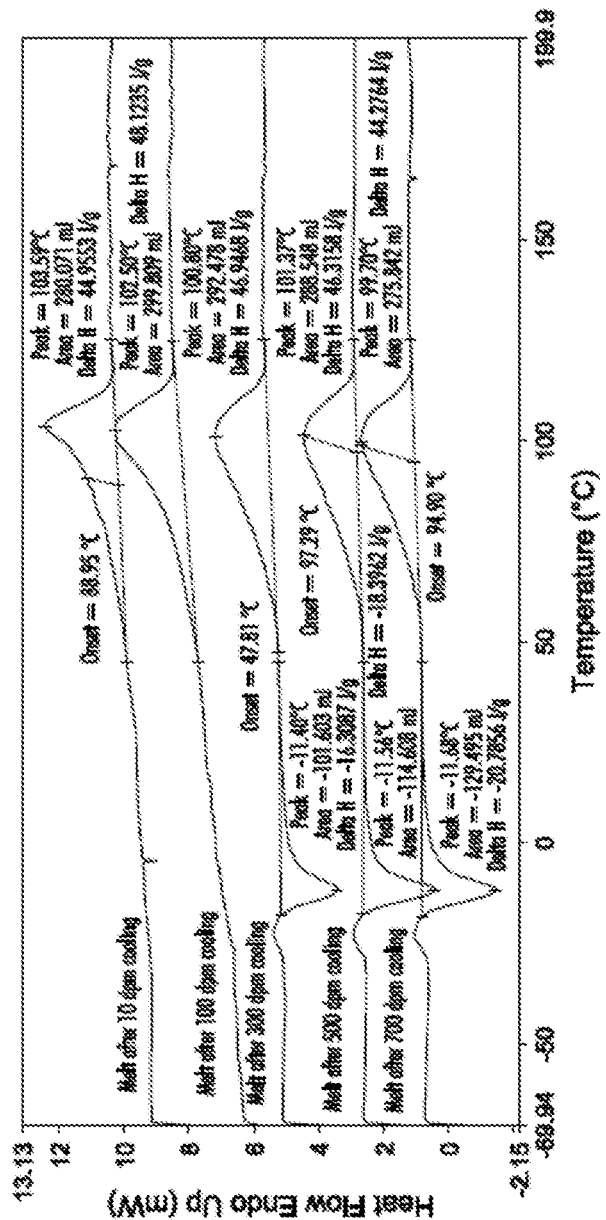
FIG. 3 shows the melting curves of Vistamaxx 3588 under different cooling rates.
Figure 4:
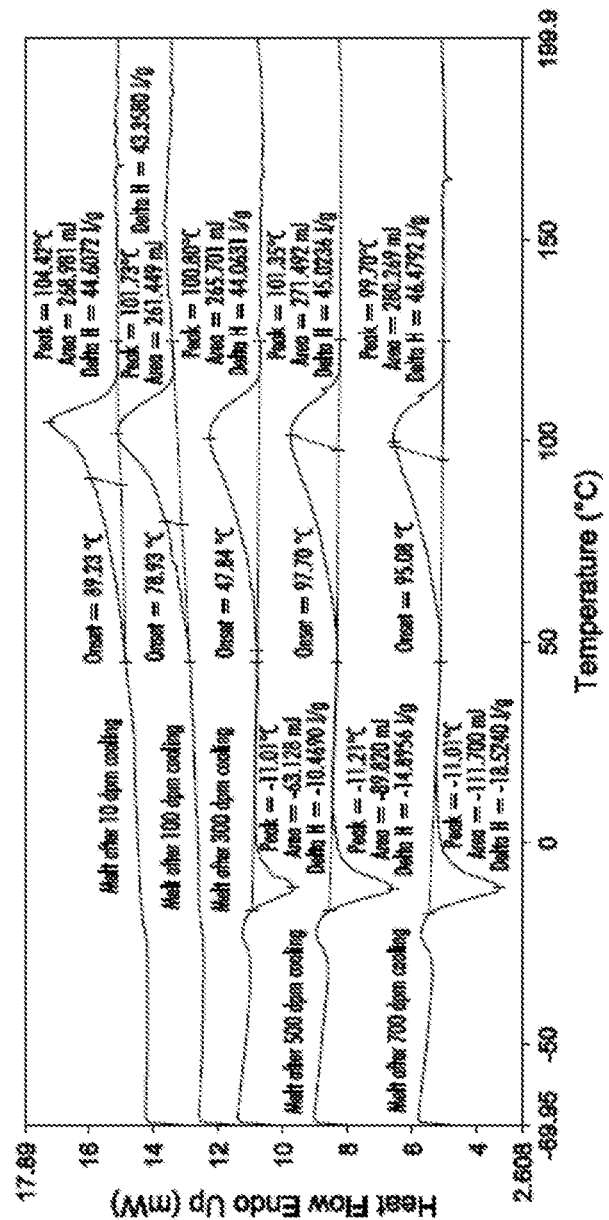
FIGS. 4-5 show the melting curves of Vistamaxxx 3588 with modifier polymers under different cooling rates.
Figure 5:
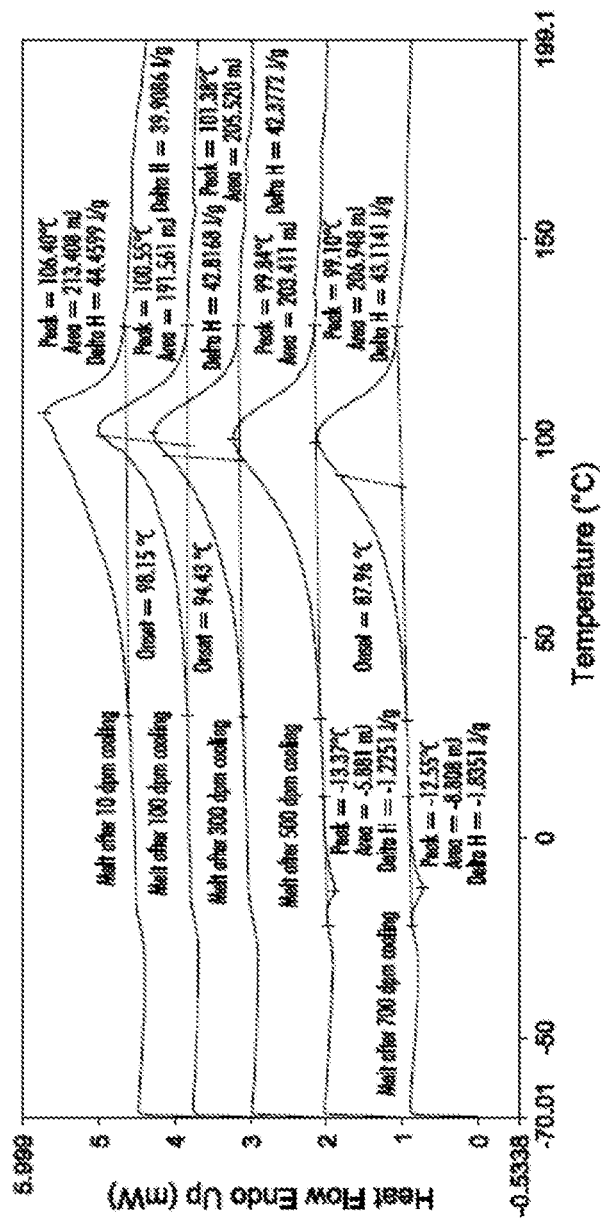

In FIG. 3, the influence of Vistamaxx 8880 and/or Adysl 5C30F on the crystallization of Vistamaxx 3588 was observed. In FIG. 4, the melting curves of a blend of 90 wt % Vistamaxx 3588 and 10 wt % Vistamaxx 8880 under different cooling rates was observed. In FIG. 5, the melting curves of a blend of 90 wt % Vistamaxx 3588 and 10 wt % Adsyl 5C30F under different cooling rates was observed.

Figure 6:
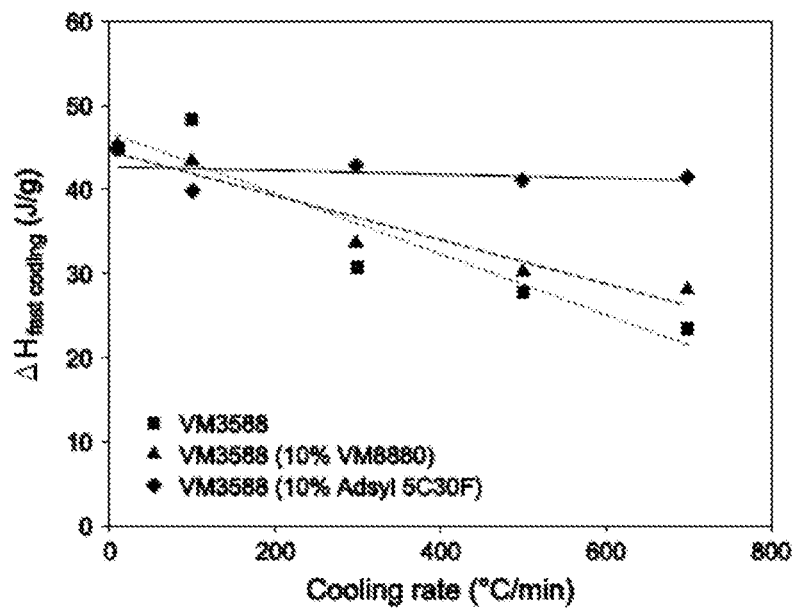
FIG. 6 shows normalized crystallinity under different cooling rates.

In FIG. 6, normalized crystallinity under different cooling rates for pure Vistamaxx 3588, blend of 90 wt % Vistamaxx 3588 and 10 wt % Vistamaxx 8880, and a blend of 90 wt % Vistamaxx 3588 and 10 wt % Adsyl 5C30F was observed. FIG. 6 indicates that 10° C./min cooling rate did not show significant effect of the change in crystallinity from adding the modifier (Vistamaxx 8880/Adsyl 5C30F). When the cooling rate was increased, the crystallinity of Vistamaxx 3588 was lower significantly as indicated by the peak area of cold crystallization. Introducing Vistamaxx 8880 had an effect of increasing the crystallization rate that cold crystallization was suppressed a little. Introducing Adsyl 5C30F had an effect of increasing the crystallization rate throughout cooling rate increases, significantly better than that of Vistamaxx 8880.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The invention claimed is:

1. A composition comprising:
   (a) about 80 wt % to about 95 wt % of a polymer blend, wherein the polymer blend comprises
      (i) about 3 wt % to about 25 wt % of a first propylene-based elastomer based on the polymer blend, and
      (ii) about 75 wt % to about 97 wt % of a second propylene-based elastomer based on the polymer blend; and
   (b) about 5 wt % to about 20 wt % of an ethylene-based polymer,
   wherein the first propylene-based elastomer and the second propylene-based elastomer each comprise the following:
      (i) propylene and from about 2 to about 25 wt % units derived from one or more C2 or C4-C12 alpha-olefins;
      (ii) triad tacticity greater than about 90%; and
      (iii) a heat of fusion less than about 75 J/g,
   and wherein the first propylene-based elastomer is different from the second propylene-based elastomer.

2. The composition of claim 1, wherein the ratio of the first propylene-based elastomer to the second propylene-based elastomer in the polymer blend is less than about 1:32.

3. The composition of claim 1, wherein the ratio of the first propylene-based elastomer to the second propylene-based elastomer in the polymer blend is less than about 1:19.

4. The composition of claim 1, wherein the first propylene-based elastomer is present in the amount of about 3 wt % to about 7 wt % based on the polymer blend and the second propylene-based elastomer is present in the amount of about 93 wt % to about 97 wt % based on the polymer blend.

5. The composition of claim 1, wherein the first propylene-based elastomer is present in the amount of about 5 wt % based on the polymer blend and the second propylene-based elastomer is present in the amount of about 95 wt % based on the polymer blend.

6. The composition of claim 1, wherein the units derived from one or more $C_2$ or $C_4$-$C_{12}$ alpha-olefins in the first propylene-based elastomer is less than that of the second propylene-based elastomer.

7. The composition of claim 6, wherein the amount of the units derived from one or more $C_2$ or $C_4$-$C_{12}$ alpha-olefins in the first propylene-based elastomer is less than about half that of the second propylene-based elastomer.

8. The composition of claim 1, wherein the first propylene-based elastomer and the second propylene-based elastomer are each a copolymer of propylene and ethylene.

9. The composition of claim 1, wherein the internal haze of the composition is less than the internal haze of the composition substantially free of the first propylene-based elastomer.

10. An article comprising the composition of claim 1.

* * * * *